Figure 1:
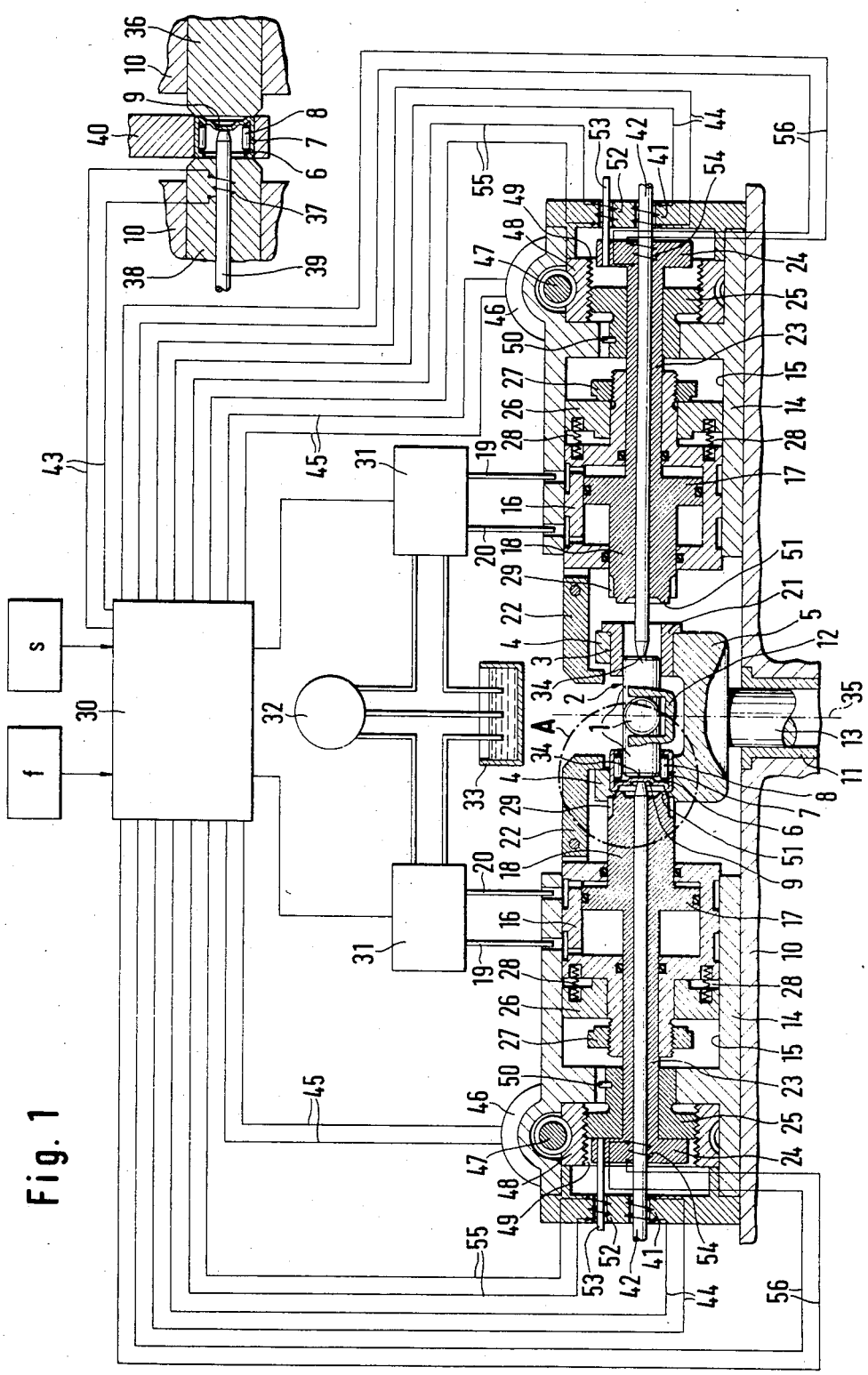

United States Patent [19]

Spiess et al.

[11] Patent Number: 4,704,782

[45] Date of Patent: Nov. 10, 1987

[54] UNIVERSAL JOINT ASSEMBLY METHOD AND APPARATUS

[75] Inventors: Karl Spiess; Waldemar Baberowski, both of Herzogenaurach; Otto Glatter, Sterpersdorf, all of Fed. Rep. of Germany

[73] Assignee: INA Walzlager Schaeffler KG, Fed. Rep. of Germany

[21] Appl. No.: 913,952

[22] Filed: Oct. 1, 1986

[30] Foreign Application Priority Data

Oct. 19, 1985 [DE] Fed. Rep. of Germany ....... 3537234

[51] Int. Cl.$^4$ .................... B23P 11/00; B23P 21/00; B23Q 15/00
[52] U.S. Cl. ...................................... 29/434; 29/407; 29/464; 29/705; 29/720
[58] Field of Search ................. 29/407, 434, 464, 700, 29/705, 720

[56] References Cited

U.S. PATENT DOCUMENTS

| | | | |
|---|---|---|---|
| 3,230,617 | 1/1966 | Spiess et al. | 29/434 |
| 3,290,754 | 12/1966 | Pitner | 29/434 |
| 3,429,021 | 2/1969 | Spiess | 29/434 X |
| 3,529,942 | 9/1970 | Pitner | 29/464 X |
| 3,701,189 | 10/1972 | Kadono et al. | 29/434 X |
| 3,786,544 | 1/1974 | Ferguson | 29/434 X |
| 4,182,011 | 1/1980 | Bretzger et al. | 29/434 X |
| 4,558,502 | 12/1985 | Gössmann et al. | 29/434 |

*Primary Examiner*—Howard N. Goldberg
*Assistant Examiner*—Ronald S. Wallace
*Attorney, Agent, or Firm*—Bierman & Muserlian

[57] ABSTRACT

A method of assembling a universal joint comprising two shafts provided with yokes at their ends and connected by means of a universal joint spider having journals supported in bores in the yokes by bearing cups which are unilaterally closed by a bottom wherein the end faces of the journals abut against the bottoms of the bearing cups, comprising initially centering the universal joint spider and the shafts relative to each other and stationarily clamped, then pressing the bearing cups in the bores in the yokes and axially fixed therein wherein the yoke arms, if necessary, are widened radially outwardly and are always immovably fixed radially inwardly, characterized in that the axial position for each bearing cup (6) in the respective bore (3) of the yoke (5) in which the bottom (9) of the bearing cup (6) abuts against the end face (34) of the respective journal (1) is measured or determined and the pressing process of the bearing cup (6) in this position is either terminated or based on this position, the pressing process is continued under elastic flexion of the bottom (9) of the bearing cup (6) by a defined dimension (f) wherein the pressing force acts upon the bottom (9) solely at its outer edge and an apparatus for performing the said method.

31 Claims, 4 Drawing Figures

UNIVERSAL JOINT ASSEMBLY METHOD AND APPARATUS

STATE OF THE ART

In universal joints, the end faces of the journals of the universal joint spider lie against the bottoms of the bearing cups either without any play or under prestress to eliminate noises created by slackness during the operation of the universal joint and to generate through the friction moment which occurs between the end faces and the bottoms a bending moment, frequently designated as braking moment in the swinging direction of the shaft which bending moment through its presence offers a control possibility as to whether the bottoms of the bearing cups are indeed lying against the end faces of the journals without play. The size of this bending moment should be kept within exacting tolerances. The normal forces necessary to generate the bending moment and occurring between the end faces of the journals and the bottoms of the bearing cups are obtained by elastically widening radially outwardly the yoke arms during pressing in and fixing of the bearing cups and/or by elastically bending outwardly the bottoms of the bearing cups during pressing in and fixing. Centering the universal joint parts relative to each other and stationary clamping is required to ensure that the universal joint parts have a central position relative to each other during assembly, especially during pressing in and fixing of the bearing cups since otherwise unbalances during operation of the universal joint are obtained, especially undesired noises upon high speeds and, upon considerable bending angles of the universal joint, periodic fluctuations of the angular velocity resulting inter alia in an increased noise level.

A known method in which two opposing bearing cups are simultaneously pressed in and fixed so that the material is shaped off the walls of the bores of the yokes by stamping and is applied to the bottoms of the bearing cups, has led to satisfactory mounting results with respect to maintaining the required size of the bending moment and also with respect to the centricity of the universal joint parts. Recently, however, the requirements with respect to the constancy of the bending moment and to the centricity of the universal joints are steadily increasing so that it is evident that the known method will not meet the increased demands in the future.

In view of the increased requirements, the deficiencies of the known method can primarily be seen in that negative influences of process tolerances of the parts to be assembled on the mounting result cannot be eliminated apart from the effect of the production-dependent fluctuations of the spring constant of the yoke arms on the precision of the possibly provided widening of the yoke arms which effects are well controlled by the known method. It usually happens that in view of varying fit tolerances, different forces are necessary for pressing in and stamping two opposing bearing cups, and thus the bottom of the bearing cups do not simultaneously abut against the end faces of the universal joint spider. Since the pressing process is terminated when the ram strikes against the end face of the journal via interposing bottom of the bearing cup, in the most unfavorable case a force acts on the universal joint which corresponds to the difference between the actual required force and the maximum force exertable by the ram which for safety reasons exceeds the maximum force to be expected usually designated as residual force. Consequently, the universal joint parts and the fastening means holding the latter are elastically deformed, thereby negatively influencing the centricity of the universal joint parts relative to each other. The described drawbacks are augmented when in view of the process tolerances the end faces of the journals of the universal joint have varying distances from the axis of the universal joint.

A further drawback occurs when, as generally the case, bearing cups are assembled whose bottoms lie with their central area projecting toward the end face of the respective journal spider against the latter and are mounted under elastic flexion. In these cases, during insertion of the bearing cup, the ram lies initially against the outside of the area projecting radially outwardly from the bottom toward the journal. Further, the ram lies at the end of the pressing process with its central area also against the outside of the area of the bottom projecting toward the journal to strike against the end face of the journal. In order to be actually able to prestress the bottom, the area of the ram abutting the central projecting area of the bottom exceeds the area of the ram abutting radially outside the projecting area of the bottom by a dimension which is slightly smaller than the distance between the central area of the bottom and its outer edge whereby the difference of both dimensions controls the flexion of the bottom and its coordinated in dependence on the desired flexion. Since the distance between the projecting central area of the inside of the bottom and the outer edge of its outside, which distance is designated as height of the bottom is subjected to process tolerances, varying flexions of the bottoms are obtained in practice resulting in differing bending moments. Moreover, varying flexions of the bottoms lead in opposing bearing cups to a loss of the centricity of the universal joint after the release thereof since the universal joint occupies a position in which the flexions of the bottoms and the resulting forces correspond to each other. So far, these phenomenona can be countered only through exacting process tolerances of the bearing cups resulting in increased costs for the bearing cups.

A method is known from DE-OS No. 3,333,666, for the simultaneous pressing in and fixing of two opposing bearing cups in which the beginning central displacement of the universal joint parts relative to each other because of the residual forces is determined by measuring elements and compensated by respective control of the pressing forces at the opposing pressing areas. However, this method permits only the prevention of those defects of centricity which are caused by the residual force. Defects obtained by varying flexions of the bottoms cannot be compensated for. Even the compensation of the defect of centricity as caused by the residual force is only possible to a limited degree since, on the one hand, such defects must first occur to trigger the control step necessary for their compensation, and, on the other hand, this control step is only effective as long as the ram does not strike against the end faces of the journals. As soon as this is the case, the central position of the universal joint parts is obtained only by increasing the flexion of the bearing cup bottom. This, however results in that defects are compensated only within very narrow limits since the bottoms of the bearing cups cannot arbitrarily be bent and moreover, the bending moment is increased inadmissibly under certain circumstances during compensation of the defect.

OBJECTS OF THE INVENTION

It is an object of the invention to provide a method of the above-stated kind by which it is possible to essentially eliminate all forces except those which are effective in the finished state of the universal joint during the assembly of the universal joint, and in which process, tolerances do not affect the magnitude of the bottom flexion and thus the bend moment.

It is another object of the invention to provide an apparatus for carrying out the method.

These and other objects and advantages of the invention will become obvious from the following detailed description.

THE INVENTION

The novel method of the invention for assembling a universal joint comprising two shafts provided with yokes at their ends and connected by means of a universal joint spider having journals supported in bores in the yokes by bearing cups which are unilaterally closed by a bottom wherein the end faces of the journals abut against the bottoms of the bearing cups, comprises, initially centering the unversial joint spider and the shafts relative to each other and stationarily clamped, then pressing the bearing cups in the bores in the yokes and axially fixed therein wherein the yoke arms, if necessary, are widened radially outwardly and are always immovably fixed radially inwardly characterized in that the axial position for each bearing cup (6) in the respective bore (3) of the yoke (5) in which the bottom (9) of the bearing cup (6) abuts against the end face (34) of the respective journal (1) is measured or determined and the pressing process of bearing cup (6) in this position is either terminated or based on this position, the pressing process is continued under elastic flexion of the bottom (9) of the bearing cup (6) by a defined dimension (f) wherein the pressing force acts upon the bottom (9) solely at its outer edge.

By measuring or determining the axial position for each bearing cup in the respective bore of the yoke in which the bottom of the bearing cup abuts against the end face of the respective journal spider and by either terminating the pressing process of the bearing cup in this position or based on this position by continuing the pressing process upon elastic flexion of the bottom of the bearing cup by a defined dimension whereby the pressing force acts upon the bottom solely at its outer edge, the objects of the invention are met.

Through this, the bearing cup is fixed in the bore of the yoke exactly in the one position in which freedom of play or a normal force required for a certain bending moment between the bottom of the bearing cup and the end face of the journal spider is obtained without having the process tolerances of the universal joint or the fit tolerances between the bores of the yokes and the bearing cups affect the accuracy of the mounting result. The normal force between the bottom of the bearing cup and the end face of the journal can be determined by considering the spring characteristic of the bottom through suitable selection of the defined dimension which corresponds to the magnitude of the elastic flexion of the bottom. In view of the fact that the pressing force acts upon the outer edge of the bottom of the bearing cup at least during the continuation of the pressing process by the defined dimension, no forces occur during the entire pressing process which would not act on the universal joint spider in the final assembly of the universal joint. In this connection, a force acts on the universal joint only when the bearing cup is assembled at elastic flexion of the bottom.

Since the magnitude of the elastic flexion can be selected by respective selection of the defined dimension, the adjustment of the ram as necessary in the known methods is eliminated so that a considerable cost reduction is obtained. Moreover, the known methods require for varying dimensions of the flexion of the bottom differently adjusted tools which are also eliminated by the method of the invention.

Especially since the pressing force acts on the outer edge of the bottom at least during the continuation of the pressing process by the defined dimension, it is prevented that forces which exceed the forces required for pressing in and possibly fixing the bearing cup can be effective. A residual force as in the known methods and obtained by striking the ram on the end face of the spider journal does not occur in the method of the invention. A further advantage of the method of the invention resides in the assembly of the bearing cup which are provided with a waffle-like stamping at the inside of the projecting area of their bottom which forms a lubricant reservoir. While in the known methods, the residual force acting during striking of the ram creates the danger that the waffle-like stamping is pressed into the end face of the journal leading to a sluggishness of the universal joint during swinging, this is completely eliminated by the method of the invention since no forces exceeding those during operation act between the bottom and the end face of the journal.

It is evident that in contrast to the known methods, there is no influence on the mounting result when two opposing bearing cups are simultaneously pressed in and the bottom of the one of both bearing cups abuts against the end face of the journal prior to the other. The slight inaccuracies, which may be caused when the bearing cups are assembled under elastic flexion of their bottoms, can be eliminated by interrupting the pressing process of the bearing cup which first abuts with its bottom against the respective journal of the universal joint until the other bearing cup lies with its bottom on the end face of the respective journal and then continuing the pressing process of both bearing cups by the defined dimension.

In case central misalignments do nevertheless occur when using this method because one of the bottoms lies first on the respective end face, albeit with an extremely small force, these can be eliminated during serial assembly by correcting the defined dimensions by which the pressing process of both bearing cups are respectively continued for the initial abutting and the other bearing cup so that the universal joint because of the varying prestresses of the bottoms of the bearing cups in the clamped stage of the universal joint parts occupies an exactly central position upon release of the universal joint. In contrast to the known methods in which the central misalignment of the universal joint parts relative to each other are measured, the method of the invention allows a correction without inadmissable increase of the flexion of the bottoms and the bending moment, respectively, even when the bearing cups lie with their bottoms already against the end faces of the journals since the correction occurs at a moment when the bottoms of the bearing cups are bent by an extremely small degree while in the known methods, the correction is carried out under certain circumstances only when the bearing cup which first lies against the end face of the journal is already axially fixed and its bottom is bent by the full dimension.

According to a modification of the invention, the axial position in which the bottom of the bearing cup abuts against the end face of the journal is determined before the insertion of the bearing cup by measuring. According to one embodiment of the invention, prior to the pressing of the bearing cup the height from its bottom and after centrally clamping the universal joint and the shaft relative to each other, the distance of the end faces of the respectively journal from the shaft axis and by pressing the bearing cup in an axial position in which the distance of the outer edge of the outside of its bottom from the shaft axis corresponds to the sum of height of its bottom and the distance of the respective end face of the journal from the shaft axis, optionally reduced by the defined dimension.

To create a control possibility to determine whether the bearing cup eventually occupies indeed the required axial position in the bore, an embodiment of the invention provides that during the pressing process, the distance of the outer edge of the outside of the bottom of the bearing cup from the shaft axis is additionally measured, compared with the calculated distance during the pressing process, and the pressing process is terminated when the measured distance corresponds to the calculated distance.

According to a modification of the invention, the beginning of the elastic flexion of the bottom of the bearing cup can further be measured during the pressing process and the pressing process can be interrupted if the flexion starts before the distance of the outer edge of the outside of the bottom from the shaft axis falls below a predetermined dimension. This allows to recognize that foreign matter is located between the bottom of the bearing cup and the end face of the journal. The pressing process and optionally the fixing of the bearing cup can then be interrupted before damages occur. This is especially of importance when needle bearings with needles retained by grease are used as bearing cups since in this instance, a needle may once in a while become loose from the holder and become jammed between the bottom of the bearing cup and the end face of the journal thereby rendering the universal joint unusable.

Another embodiment of the invention provides that the axial position in which the bottom of the bearing cup lies against the end face of the journal is measured during the pressing process and thus provides the advantage that during automatic serial assembly, no additional time is necessary for measuring steps leading to a prolongation of the cycle.

According to a modification, it is provided that the axial position in which the bottom of the bearing cup lies against the end face of the journal is measured so that the beginning of the elastic flexion of the bottom of the bearing cup is determined whereby according to a modification of the invention, in case the pressing process is continued by a defined dimension, it is provided that the size of the elastic flexion of the bottom is measured during the entire pressing process and the latter is terminated when the magnitude of the flexion corresponds to the defined dimension. Therefore, the elastic flexion of the bottom required for achieving a certain bending moment is directly used for terminating the pressing process, According to a modification of the invention, it can also be provided that during the inserting additionally at least from the beginning of the flexion of the bottom of the bearing cup, the distance of the outer edge of the outside of its bottom from the shaft axis is measured and the pressing process in terminated when the distance obtained at the beginning of the flexion has been reduced by the defined dimension.

A further embodiment of the invention provides that the distance of the outer edge of the outside of the bottom of the bearing cup from the joint axis is measured during the entire pressing process and the pressing process is interrupted if the flexion of the bottom starts before the distance of the outer edge of the outside of the bottom from the joint axis falls below a predetermined dimension. This maeasure serves the purpose of recognizing the existence of foreign matter between the bottom of the bearing cup and the end face of the journal, and of prematurely terminating the pressing process.

To guarantee, in the case the bearing cup is assembled at elastic flexion of its bottom, that the forces acting during the insertion of the bearing cup onto the universal joint correspond exactly to those which are present in the assembled stage of the universal joint a modification of the invention provides that the yoke is elastically widened by such a dimension that the resulting force corresponds to the force resulting of the elastic flexion of the bottom of the bearing cups by the defined dimension. After release of the finally assembled universal joint, no compensations occur which could lead to an alteration of the forces acting on the universal joint and thus to an alteration of its position.

According to an additional embodiment of the invention, the bearing cup is axially fixed by shaping off in non-cutting manner, e.g., through stamping material from the wall of the bore of the yoke and bringing it into contact at the outer edge of the outside of the bottom of the bearing cup. According to an embodiment of the invention, material is regionally shaped off the wall of the bore in at least three areas spaced along the circumference of the bore in circumferential direction. According to the embodiment of the invention, the pressing in the bearing cup and the shaping off of material is essentially obtained simultaneously in one working step.

An apparatus of the invention for carrying out a method of the invention in which the axial position in which the bottom of the bearing cup lies against the end face of the journal is determined before the insertion of the bearing cup comprises a frame, centering and clamping means for the universal joint and the shafts, optional means for widening and clamp means for fixing the yoke arms, a ram for pressing in and means for fixing the bearing cup as well as a control unit for the assembling process, characterized in that (a) measuring means are provided to measure the height of the bottom of the bearing cup, and to measure the distance of the end face of the journal of the universal joint spider from the shaft axis wherein the measuring means transmit the determined dimensions to the control unit, (b) means for terminating the pressure process are provided which can be actuated by the control unit, and (c) the control unit, in which optionally the defined dimension (f) can be stored, adds the dimensions determined by the measuring means, optionally reduces it by the defined dimension, and actuates the means for terminating the pressing process so that at the end of the pressing process, the distance of the outer edge of the outside of the bottom of the bearing cup from the shaft axis corresponds to the previously calculated dimension.

Since through the method of the invention, the manufacturing tolerances of the parts to be assembled do not disadvantageously affect the assembling process, the precision achievable during the assembly with the apparatus of the invention depends with regard to the centricity as well as also to the bending moment only upon the precision with which the measurements are carried out and with which the means for termination of the pressing process are actuated.

The precision achievable during assembly can then be increased when, according to a modification of the invention, the apparatus includes measuring means to determine the distance of the outer edge of the outside of the bottom from the shaft axis during the pressing process and to transmit it to the control unit which compares the respectively obtained distance with the calculated one and actuates the means for termination of the pressing process so that the latter is terminated at corresponding dimensions.

To recognize the presence of the foreign matter between the bottom of the bearing cup and the end face of the journal, the apparatus according to one embodiment of the invention includes measuring means to determine the beginning of the elastic flexion of the bottom of the bearing cup and to transmit it to the control unit in which a predetermined dimension is stored for the distance of the outer edge of the outside of the bottom of the bearing cup from the shaft axis and which compares the dimension of the distance of the bottom from the shaft axis with the predetermined dimension during the pressing process and also actuates provided means for interruption of the pressing force or means for termination of the pressing process so that the latter terminates when the measuring means determine the beginning of the flexion of the bottom before falling below the predetermined dimension.

An apparatus of the invention for carrying out a method of the invention in which the axial position in which the bottom of the bearing cup lies against the end face of the journal is determined by determining the beginning of the elastic flexion of the bottom of the bearing cup comprises a frame, means for centering and clamping the universal joint spider and the shafts, optional means for widening, clamp means for fixing the yoke arms, a ram for pressing in and means for fixing the bearing cup as well as a control unit for the assembly process, characterized in that (a) measuring means are provided for determining the beginning of the flexion of the bottom of the bearing cup and transmitting it to the control units, (b) means for termination of the pressing process are provided which actuate the control unit, and (c) the control unit, in which optionally the defined dimension is stored, actuates the means for termination of the pressing process so that the latter terminates upon beginning of the elastic flexion of the bottom of the bearing cup or after continuation of the pressing process by a defined dimension.

Because of the method of the invention, also in this case, the meanufacturing tolerances of the parts to be mounted cannot disadvantageously affect the assembly process so that the precision achievable during assembly is dependent only upon the precision of a single measuring process and on the precision with which the means for termination of the pressing step are actuated.

According to a modification of the invention, the measuring means determine the magnitude of the flexion of the bottom of the bearing cup during the entire pressing process, and the control unit actuates the means for termination of the pressing process so that the latter terminates when the determined flexion of the bottom corresponds to the defined dimension whereby the magnitude of the flexion of the bottom is determined so that according to an embodiment of the invention, measuring means are provided which at the beginning of the flexion of the bottom of the bearing cup determines the distance of the outer edge of the outside of its bottom from the shaft axis and transmits it to the control unit which actuates the means for termination of the pressing process so that the latter terminates when the distance is reduced by the defined dimension.

The existence of foreign material between the bottom of the bearing cup and the end face of the journal can be determined so that according to a modification of the invention the measuring means determine the distance of the outer edge of the bottom from the shaft axis during the entire pressing process and transmit it to the control unit in which a predetermined dimension is stored for the distannce of the outer edge of the outside of the bottom of the bearing cup from the shaft axis and which during the entire pressing process compares the dimension of the distance of the bottom from the shaft axis with the predetermined dimension and, moreover, actuates provided means for interruption of the pressing force or the means for termination of the pressing process so that the latter is halted when the measuring means determine the beginning of the flexion of the bottom before falling below the predetermined dimension.

According to a modification of the invention, the means for termination of the pressing process are defined by elements for termination of the ram path which elements are actuated by the control unit and are represented by stops adjustable by the control unit. To guarantee that the bottom of the bearing cup is acted upon by the pressing force only at its outer edge, an embodiment of the invention provides that the ram has an annular projection with which the ram lies against the outer edge of the bottom of the bearing cup.

In case the bearing cup is axially fixed by shaping off material in non-cutting manner, e.g., by stamping from the wall of the bore of the yoke and brought into contact at the outer edge of the outside of the bottom of the bearing cup, an embodiment of the invention provides that the means for fixing the bearing cup are represented by longitudinally directed projections attached to the outer surface of the ram and ending at a distance to the end face of the annular projection of the ram while their outer edges are arranged on a diameter which exceeds the diameter of the bore of the yoke. Thus, it is possible to obtain the pressing in and the fixing of the bearing cup in one working step whereby the distance by which the projections extends short of the end face of the annular projection is dimensioned so that the material shaped off from the bores of the yokes finds sufficient space to prevent material accumulated in front of the projections lifting off the outside of the bottom of the bearing cup from the annular projection of the ram.

According to a modification of the invention, the measuring means to measure the distance of the end faces of the journal of the universal joint spider from the shaft axis are constituted by an inductive displacement pickup whose armature is longitudinally shiftably supported in the ram and whose coil is attached stationarily to the frame. Another modification of the invention provides measuring means to measure the height of the bottom of the bearing cup which are defined by an inductive displacement pickup whose armature is longitudinally shiftably supported in the frame and whose coil is attached stationarily to the frame.

An embodiment of the invention provides measuring means to determine the distance of the outer edge of the outside of the bottom of the bearing cup from the shaft axis which are defined by an inductive displacement pickup whose coil is attached stationarily to the frame and whose armature is attached to the ram.

A modification of the invention provides measuring means to determine the flexion of the bottom of the bearing cup which are defined by an inductive displacement pickup whose armature is longitudinally shiftably supported in the ram and projects outwardly from its end face at the center and whose coil is attached stationarily with the ram.

According to a final embodiment of the invention, the measuring means to determine the distance of the outer edge of the outside of the bottom of the bearing cup from the shaft axis and/or the flexion of the bottom include, in addition, an inductive displacement pickup whose coil is attached to the ram and whose armature is longitudinally shiftably supported in the ram and extends outwardly through the annular projection.

Figure 2:
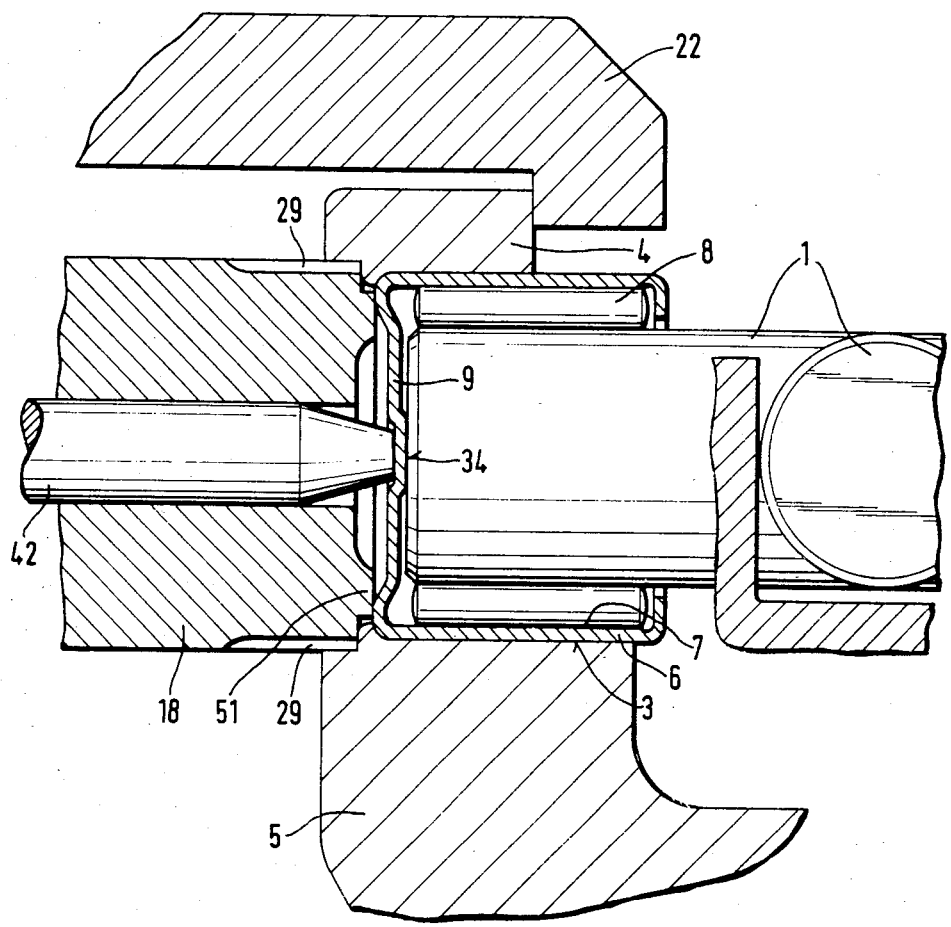
Figure 3:
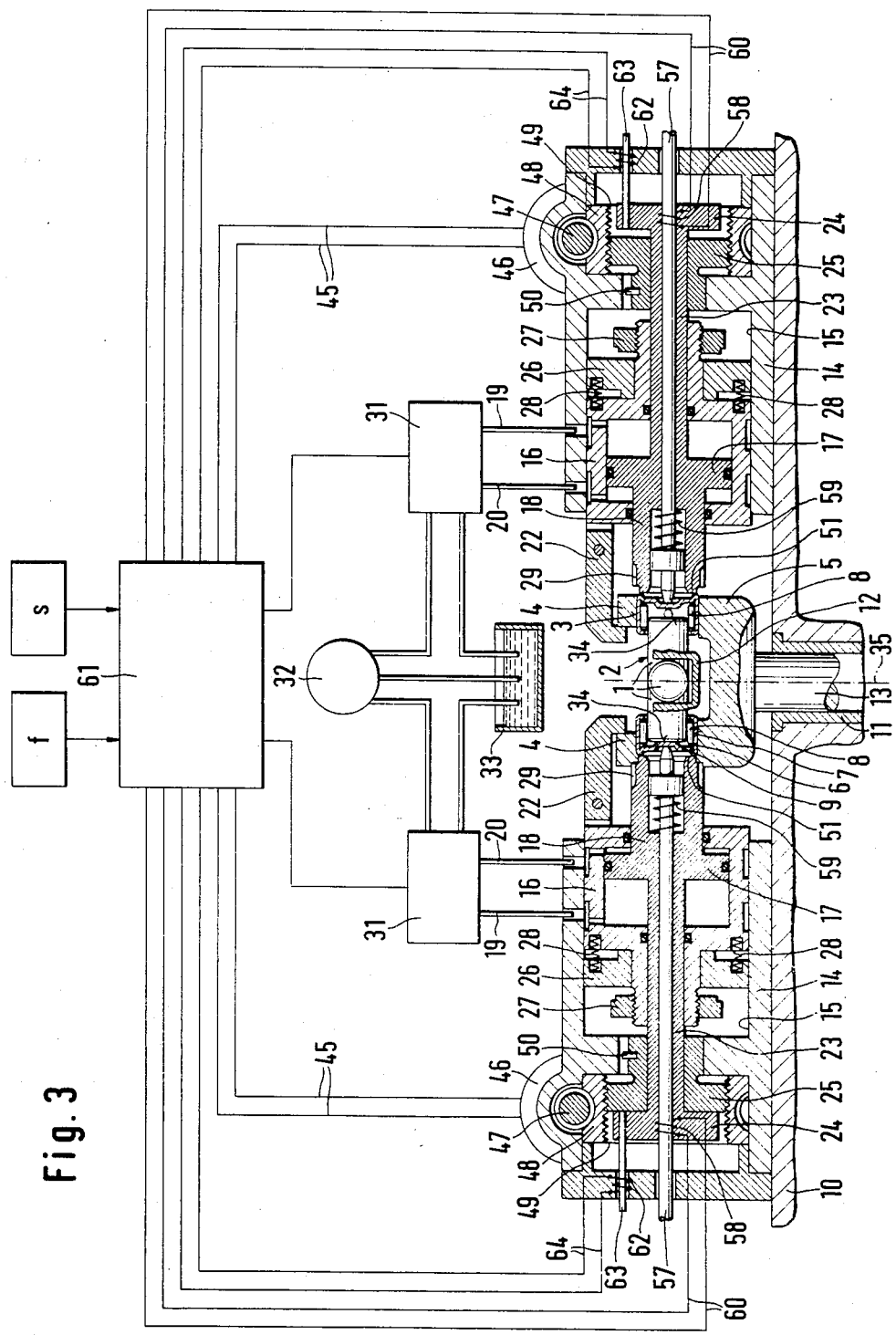
Figure 4:
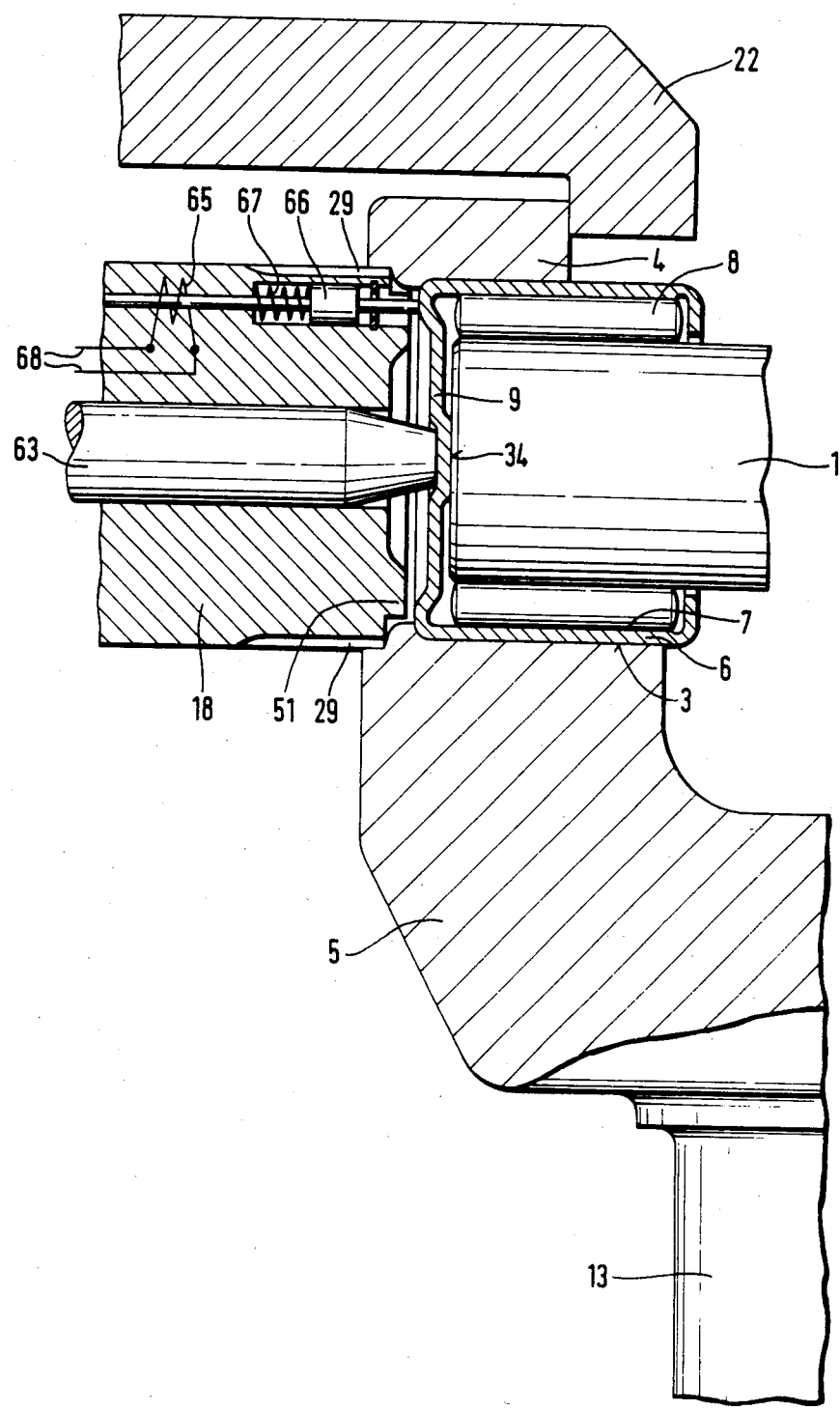

Referring now to the drawings:

FIG. 1 is a longitudinal cross-section of an apparatus of the invention in schematic illustration, FIG. 2 is the detail A of FIG. 1 on an enlarged scale, FIG. 3 is a longitudinal cross-section of another apparatus of the invention in schematic illustration and FIG. 4 is a detail of an apparatus of the invention on an enlarged scale.

FIGS. 1 and 2 show an apparatus of the invention for assembling a universal joint by a method of the invention in which the journals 1 of the universal joint spider 2 are supported in the bores 3 of the yoke arms 4 of the yoke 5 of the universal joint by thinwalled bearing cups 6 defining bores 7 between which and the outer surfaces of the journals 1 needles 8 roll off. At the right half of FIG. 1, an operating state is shown which occurs before the pressing in and fixing of the bearing cups 6 while the left half of FIG. 1 illustrates the the operating state depicting the pressing in and fixing of the bearing cup 6. In the method carried out with the apparatus of the invention, the axial position in which the bottoms 9 of the bearing cups 6 lie on the end faces of the journals 1 is measured prior to the pressing of the bearing cups 6 into the bores 3.

The apparatus includes clamping and centering means 11 and 12 stationarily attached to a frame 10 and provided for centering relative to each other and clamping the universal joint spider 2 and the yoke 5 which is linked to a shaft 13. Further, two casings 14 are provided which are stationarily attached to the frame 10 and are arranged radially outside the clamping and centering means 11 and 12 and retain in their bores 15 a cylinder 16, respectively. The cylinders 16 are movable in the longitudinal direction within the bores 15 and accommodate a piston 17, respectively. The pistons 17 support at their ends facing the clamping and centering means 11 and 12 a respective ram section 18 which insert the bearing cups 6 and reciprocate by means of a pressure medium supplied to the cylinders 16 through the lines 19 and 20. The yoke 5 and the universal joint spider 2 are retained in the clamping and centering means 11 and 12 so that the longitudinal axes of the cylinders 16 along which the pistons 17 are moveable with their ram sections 18 coincides with the common axis of the bores 3 of the york 5 and the axis of the journals 1 of the universal joint spider centered therein. Besides the already mentioned clamping and centering means 11 and 12, centering cups 21 are provided which are illustrated at the right half of FIG. 1. These centering cups 21 correspond in their radial dimensions to the bearing cups 6 and are removed from the bores 3 of the yoke arms 4 after clamping the parts of the universal joint.

Hinged to the cylinders 16 is a respective hook 22 which embraces radially inwardly the respective yoke arm 4 so that during the pressing process of the bearing cups 6 as shown in the left half of FIG. 1, the flow of force of the pressing force applied by the cylinders 16 is closed via the hooks 22 without encountering a displacement of the yoke arms 4 by the action of the pressing force.

In some instances, it is desired to widen the yoke arms 4 radially outwardly. Accordingly, the pistons 17 support axially opposite to the ram section 18 extensions 23 with stops 24 which engage with stops 25 connected to the casing 14 for limiting the piston stroke in the pressing direction. Moreover, the casings 14 are provided with stops 26 which limit the shifting distance of the cylinders 16 in the direction opposite to the pressing direction whereby the cylinders 16 are provided with a further adjustable stop 27 which limits their shifting path in pressing direction by cooperating with the respective stop 26. Since compression springs 28 are arranged between the back walls of the cylinders 16 and the stops 26, the cylinders 16, as long as no pressure medium acts on the pistons 17, occupy the position as illustrated at the right half of FIG. 1 in which position they are shifted in pressing direction to such an extent as permitted by the shop 27 which then abuts stop 26.

Widening of the yoke arms 4 whose magnitude corresponds to the distance by which the cylinders 16 are displaceable axially within the casings 14 in dependence on the limits set by the stops 26 and 27 and variable by adjusting the stop 27 is obtained when the pistons 17 contact with their stops 24 the stops 25 at the end of the pressing process are shown in the left half of FIG. 1. By feeding further pressure medium to the cylinders 16 via the line 19 and since the pistons 17 cannot cover a further distance, the cylinders 16 are shifted opposite to the pressing direction under the action of the pressure medium until abutting with their back wall the stops 26 against the force of the compression springs 28. Since the hooks 22 which are linked to the cylinders 16 embrace the yoke arms 4, the latter follow the movement of the pistons 17 resulting in the desired widening of the yoke arms 4. Since in view of the pressing force and the holding force of the hooks 22 which holding force acts in opposite direction, a bending moment acts radially outwardly on the yoke arms 4 to obtain a widening, it is possible that at small dimensions for the widening of the yoke 5, the cylinders 16 contact the stops 26 with their back walls before the pistons 17 abut the stops 25 with their stops 24.

For fixing the bearing cups 6 in the bores 3 of the yoke arms 4, the ram sections 18 are provided with strip-like projections 29 by which material is shaped off the walls of the bores 3 during the pressing process as can be seen from FIG. 2 and brought in contact with the outside of the bottoms 9 of the bearing cups 6. To control the assembly, a control unit 30 is provided which depending on whether the pistons 17 should be moved in pressing direction or opposite thereto connects the lines 19 or 20 via valves 31 with the pressure medium source 32 or the pressure medium reservoir 33.

The apparatus according to the invention further includes measuring means to measure the height of the bottoms 9 of the bearing cups 6 and the distance of the end faces 34 of the journals 1 of the universal joint spider 2 from the shaft axis 35, respectively. The measuring means for measurement of the height of the bottom 9 include a support 36 stationarily attached with the frame 10 and provided for the other edge of the outside of the bottom 9 of the bearing cup 6 and an inductive displacement pickup. The coil 37 of the displacement pickup is retained in a member 38 which is stationarily attached with the frame 10 and in which the armature 39 of the displacement pickup is longitudinally moveable in the axial direction of the bearing cup 6. The bearing cup 6 is held against the support 36 by a gripper 40 so that the outer edge of its bottom 9 abuts thereagainst. In addition, the gripper 40 serves to bring bearing cup 6 in pressing position. For illustrative reasons, the described measuring means are illustrated in FIG. 1 at the right side above the remaining apparatus but in practice, these measuring means are arranged on the frame 10 so that the bearing cups 6 can be brought in pressing direction by a plane movement of the gripper 40.

The measuring means for measurement of the distances between the end faces 34 and the shaft axis 35 are also constituted by inductive displacement pickups. The coils 41 thereof are stationarily affixed in the casings 14 while the armature 42 thereof is supported within the pistons 17 longitudinally moveable in the direction of the axis of the journals 1 of the inversal joint spider 2 and project outwardly through the end faces of the ram section 18. The measuring dimensions for the heights of the bottoms 9 and the distance of the end faces 34 from the shaft axis 35 are transmitted to the control unit 30 via lines 43 and 44.

Furthermore, the apparatus of the invention includes a unit for termination of the pressing process which unit is constituted by the already mentioned stops 25. These stops 25 are actuated via lines 45 through the control unit 30 by the servomotors 46. For this purpose, worm pinions 47 which are attached to the shafts of the servomotors 46 are in engagement with their nuts 48 designed as worm wheels at their outer circumference and supported in the casings 14 in a rotatable but radially and axially immovable manner. The nuts 48 are in engagement by means of thread 49 with the stops 25 which are axially displaceable in the casings 14 and non-rotatably supported because of the pins 50. By actuating the servomotors 46, axial displacements of the stops 25 in the casings 14 are caused. The ram sections 18 are provided with annular projections 51 which ensure that the pressing force acts upon the bottoms 9 of the bearing cups 6 exclusively along the area of the outer edge thereof.

The already mentioned control unit 30 is designed so that the measuring values for the respective distance of the end faces 34 of the journals 1 from the shaft axis 35 and for the height of the bottoms 9 of the associated bearing cups 6 are added and the stops are positioned by the servomotors 46 so that during termination of the pressing process, that is when the pistons 17 abut the stops 25 with their stops 24, the distance of the end faces of the annular projections 51 of the ram sections 18 from the shaft axis 35 corresponds to the respective sum of the mentioned measuring values. Moreover, a defined dimension (f) can externally be fed into the control unit 30 which corresponds to the possibly desired elastic flexion of the bottoms 9 of the bearing cups 6 and is stored in the control unit 30. Provided a dimension (f) is stored in the control unit 30, the latter substracts the dimension from the respective sums of measuring dimensions prior to actuating the servomotors 46 and positions the stops 25 by the servomotors 46 so that at termination of the pressing process, the distance of the end faces of the annular projections 51 of the ram sections 18 from the shaft axis 35 corresponds to the respectively associated sum of measuring dimensions reduced by the dimension (f).

Assembly of a universal joint by the apparatus of the invention is obtained in accordance with a method of the invention by initially threading the universal joint spider 2 with its journal 1 into the yoke 5 and by centering relative to each other and clamping the yoke 5 and the universal joint spider 2 by the clamping and centering means 11 and 12 with the help of the centering cups 21 so that the axes of the journals 1 of the universal joint spider 2 coincides with the axes of the bores 3 of the yoke 5 and the axes of the pistons 17 and ram sections 18, respectively.

As illustrated in the right half of FIG. 1, the armatures 42 for measurement of the distance of the end faces 34 of the journals 1 from the shaft axis 35 are then brought into engagement with the end faces 34 and the obtained measuring values are transmitted to the control unit 30. Moreover, the bearing cups 6 are furnished prior to the pressing process by the grippers 40 to the described measuring means for measuring the height of the bottoms 9 thereof; thereafter, armature 39 of the displacement pickup is engaged with the bottom 9 of the bearing cup 6 and the thus determined measuring value for the height of the bottom 9 is transmitted to the control unit 30 whereby a fixed relationship is maintained between the bearing cup 6 and one specific journal 1. After the measuring step, the bearing cups 6 are furnished to their pressing in position at the respective journal 1.

Then, the control unit processes the measuring values in the above-described manner, optionally by considering a defined dimension (f) for the elastic flexion of the bottoms 9 of the bearing cups 6, and actuates the stops 25 for termination of the pressing process by the servomotors 46 so that when subsequently the valves 31 are actuated so that pressure medium acts upon the pistons 17 through the line 19 and the bearing cups 6 are pressed in the bores 3, the pressing process is either terminated when the bottoms 9 of the bearing cups 6 just abut against the end faces 34 of the journal 1 or is continued by the defined dimension (f) upon elastic flexion of the bottoms 9 of the bearing cups 6 in the event such a dimension (f) is stored in the control unit 30. Simultaneously with the insertion during which the pressing force acts on the bearing cups 6 only at the outer edge of the outside of the bottoms 9 thereof, the bearing cups 6 are axially fixed by shaping off material from the walls of the bores 3 which is brought into contact with the bottoms 9 of the bearing cups 6.

Should the yoke arms 4 be radially widened during the assembly, the stops 27 are adjusted in the above described manner so that the cylinders 16 are axially displaced in the casings 14 by the desired dimension of widening. In case an elastic flexion of the bottoms 9 by a dimension (f) as well as a widening of the yoke arms 4 is intended, the stops 27 are preferably adjusted so that the force caused by the deformation of the yoke arms 4 corresponds to the force resulting from the elastic flexion of the bottoms 9 of the bearing cups 6.

The apparatus of the invention includes further inductive displacement pickups which comprise coils 52 fixedly attached with the casings 14 and armatures 53 attached to the pistons 17 and provided for measuring the instantaneous position of the pistons 17 relative to the shaft axis during the pressing process and thus the distance of the outside of the outer edge of the bottoms 9 from the shaft axis 35. Moreover, coils 54 are attached to the pistons 17 and constituting together with the armatures 42 which as illustrated in the left half of FIG. 1 are kept in contact with the bottoms 9 of the bearing cups 6 during the pressing process by not shown means, further inductive displacement pickups for measuring relative movements between the pistons 17 and their ram sections 18, respectively, and the bottoms 9 of the bearing cups 6. Such relative movements occur when the bottom 9 are elastically bent. The coils 52 and 54 are connected with the control unit 30 via lines 55 and 56.

The control unit 30 is further designed so that from outside a specific dimension(s) can be fed and stored therein. Dimension(s) corresponds to the distance of the outer edge of the outside of the bottoms 9 of the bearing cups 6 or the end faces of the annular projections 51 of the ram sections 18 from the shaft axis 35 at which distance, when considering all manufacturing tolerances of the parts to be assembled, the bottoms 9 of the bearing cups 6 abut against the end faces 34 of the journals 1 of the universal joint spider 2 at the earliest. During the pressing process, the control unit 30 compares the distance of the outer edge of the outsides of the bottoms 9 of the bearing cups 6 as measured by the inductive displacement pickups constituted by the coils 52 and the armatures 53 with the dimension(s) and actuates one of both valves 31 so that the pressing process is interrupted when one of the inductive displacement pickups as constituted by the coils 54 and the armatures 42 signals a flexion of the bottom 9 of the respective bearing cup 6 before falling below the dimension(s). If a flexion of the bottom 9 of one of the bearing cups 6 occurs before falling below dimension(s), this means that foreign matter is located between the bottom 9 of the bearing cup 6 and the end face 34 of the respective journal 1 so that the pressing process must be interrupted to prevent damage of the apparatus, especially of the ram section 18.

Assuming a respective design of the control unit 30, the apparatus illustrated in FIGS. 1 and 2 for carrying out a method of the invention in which method an elastic flexion of the bottoms 9 of the bearing cups 6 is constantly provided can also be operated so that the control unit 30 based on the measuring values determined for the height of the bottoms 9 of the bearing cups 6 and for the distances of the end faces 34 of the journals 1 from the shaft axis 35 initially actuates the stops 25 by the servomotors 46 so that the pressing process is carried out until the bottoms 9 abut agains the end faces 34 in the above described manner. Based on this position, the stops 25, by maintaining the pressure supplied to the cylinders 16 via the line 19, are moved in pressing direction by the control unit 30 via the servomotors 46, which control unit 30 compares the flexion as determined by the displacement pickup constituted by the coils 54 and the armatures 42 with the defined dimension (f), as long as the measured values of the flexions of the bottoms 9 correspond with the dimension (f) whereupon the control unit 30 stops the pressing process.

Upon respective design of the control unit 30, the apparatus of the invention can also be operated so that the control unit 30 initially positions the stops 25 by the servomotors 46 in a position furthest away from the shaft axis 35 and then actuates the valves 31 so that the pistons 17 are acted upon by pressure medium via the lines 19. Thereafter, the control unit 30 which compares the distance of the bottoms 9 of the bearing cups 6 as determined by the displacement pickup constituted by the coils 52 and the armatures 53 with the previously calculated dimensions shifts the stops 25 by the servomotors 46 in pressing direction as long as the respectively measured values correspond with the respectively calculated values for the distances of the bottoms 9 of the bearing cups 6 from the shaft axis 35 whereupon the control unit 30 terminates the pressing process.

An apparatus of the invention for performing a method of the invention is illustrated in FIG. 3 depicting the axial position in which the bottoms 9 of the bearing cups 6 abut against the end faces 34 of the journals 1 and which position is determined during the pressing process. The apparatus of FIG. 3 corresponds in its mechanical design to the previously described apparatus except for the measuring means and the control unit.

In detail, armatures 57 are arranged longitudinally moveable in the pistons 17 and define inductive displacement pickups with the coils 58 which are stationarily attached to the pistons 17 and are kept by compression springs 59 in engagement with the bottoms 9 of the bearing cups 6 during the entire pressing process. The displacement pickups whose coil 58 are connected via lines 60 to a control unit 61 are provided for determining the beginning and optionally the magnitude of the elastic flexion of the bottoms 9 of the bearing cups 6 by the relative movement between the pistons 17 or the coils 58 and the armatures 57, respectively, and for transmitting it to the control unit 61.

The control unit 61 is designed so that externally a defined dimension (f) can be fed in which may correspond to the possibly desired flexion of the bottoms 9 of the bearing cups 6 and is storable therein. During the pressing process, the control unit 61 compares the values determined by the inductive displacement pickups for the flexion of the bottoms 9 with the defined dimension (f) if such is stored. In case dimension (f) is not stored, the control unit 61 determines only the beginning of the elastic flexion of the bottoms 9. Moreover, the control unit 61 controls the movement of the pistons 17 by the valves 31 and actuates the stops 25 via servomotors 46.

The assembly of a universal joint by the apparatus of the invention is obtained by the method of the invention so that the pistons 17 are completely retracted and the stops 25 are brought into abutment with the control unit 61 via the servomotors 46 with the stops 24 which are provided on the pistons 17. Pressure medium is admitted through lines 19 to the cylinders 16 via the valves 31 which are actuated by the control unit 61 and the stops 25 are actuated by the control unit 61 via the servomotors 46 so that the pistons 17 move with the stops 25 in the pressing direction. As soon as the bearing cups 6 abut with their bottoms 9 the end faces 34 of the journals 1, a relative movement occurs between the piston 17 and the coils 58, respectively, and the armatures 57 which relative movement is transmitted as a signal to the control unit 61. When a defined dimension (f) is stored in the control unit 61, the pressing process for each cup 6 is continued by further adjusting the stops 25 in the pressing direction as long as the control unit 61 determines through constant comparison of the flexions of the bottoms 9 respectively detected by the inductive displacement pickups with the dimension (f) that both are the same. The pressing process is then terminated. In the event an elastic flexion of the bottoms 9 is not desired, the pressing process of each cup 6 is interrupted by the control unit 61 as soon as the respective inductive displacement pickup in view of the presence of a signal transmits to the control unit 61 the start of the flexion of the respective bottom 9. A possible widening, of the yoke arm 4 is provided in the said manner.

The apparatus of the invention includes further additional inductive displacement pickups constituted by coils 62 fixedly attached with the frame 10 and armatures 63 attached to the pistons 17 and are provided to determine during the pressing process the instantaneous position of the pistons 17 relative to the shaft axis 35 and thus the distance of the outer edge of the outside of the bottoms 9 of the bearing cups 6 from the shaft axis 35. The coils 62 are connected via lines 64 with the control unit 61 which moreover is designed so that a specific dimension(s) can externally be fed in and stored whereby the dimension(s) corresponds to the distance of the outer edge of the outside of the bottoms 9 of the bearing cups 6 and the end faces of the annular projections of the ram sections 18 respectively, from the shaft axis 35 at which distance, when considering all manufacturing tolerances of the parts to be assembled, the bottoms 9 of the bearing cup contact the end faces 34 of the journals 1 of the universal joint spider 2 at the earliest. During the pressing process, the control unit 61 compares the distance of the outer edge of the outside of the bottoms 9 from the shaft axis 35 as measured by the inductive displacement picksup constituted by the coils 62 and the armatures 63 with the dimension(s) and actuates one of both valves 31 or one or both servomotors 46 so that the pressing process is interrupted when one of the inductive displacement pickups as constituted by the armatures 57 and coils 58 signals a flexion of the respective bottom 9 before falling below the dimension(s). Thus, as shown in the right half of FIG. 3, when a needle 8 becomes detached from the grease holder in the bearing cup 6 and is clamped between the bottom 9 of the bearing cup 6 and the end face 34 of the respective journal 1, damage of the apparatus, especially of the annular projection 51 of the ram section 18 are prevented.

Assuming a respective design of the control unit 61, the apparatus as illustrated in FIG. 3 for carrying out a method of the invention in which method an elastic flexion of the bottoms 9 of the bearing cups 6 is continuously provided can be operated also so that the stops 25 are initially adjusted in the pressing direction by the control unit 61 until the displacement pickups as constituted by the coils 58 and the armatures 57 respectively signal the beginning of the elastic flexion of the bottom 9 to the control unit 61. Based on this position, the stops 25 are further adjusted in the pressing direction by the control unit 61 which compares the distance of the piston 17 as measured based on this position by the inductive displacement pickups constituted by the coils 62 and the armatures 63 and which distance constitutes a dimension for the distance of the outer edge of the outside of the bottoms 9 of the respective bearing cup 6 from the shaft axis 35, with the defined dimension (f) until the distance of the outer edge of the outside of the bottom 9 of the corresponding bearing cup 6 from the shaft axis 35 is reduced by the dimension (f) whereupon the pressing process of the respective bearing cup is terminated.

FIG. 4 illustrates the arrangement of an additional inductive displacement pickup within the ram section 18 of a piston 17 which is usable in the apparatus as illustrated in FIGS. 1 and 2 as well as in the apparatus as illustrated in FIG. 3. The displacement pickup includes a coil 65 fixed in the ram section 18 and an armature 66 longitudinally moveable therein and projecting outwardly through the annular projection 51 of the ram section 18. A compression spring 67 retains the armature 66 continuously in engagement with the bottom 9 of the bearing cup 6. This additional inductive displacement pickup is provided to prevent measuring errors encountered during the determination of the distance of the outer edge of the bottom 9 of the bearing cup 6 from the shaft axis 35 as well as during the measurement of the flexion of the bottom 9 of the bearing cup 6 when, as illustrated in FIG. 4, during the end phase of the pressing process, the outer edge of the outside of the bottom 9 is lifted off from the annular projection 51 of the ram section 18 because of excess material shaped off the wall of the bore 3 of the yoke arm 4.

In case of determination of the elastic flexion of the bottom 9 as well as in case of determination of the distance of the bottom 9 from the shaft axis 35, the measuring value as provided by the inductive displacement pickup and fed to the control unit 30 and 61, respectively via lines 68 corresponds to the distance of the outer edge of the outside of the bottom 9 from the end face of the annular projection 51 and is subtracted by the control unit 30 and 61, respectively, from the measuring value for the flexion of the bottom 9 and for the distance of the bottom 9 from the shaft axis, respectively.

In the Figures, only the insertion and the fixing of the first pair of opposing bearing cups 6 is illustrated. Assembly of the other pair of bearing cups 6 is carried out in an essentially similar manner in a second working step. Provided a respective design of the apparatus, it is also possible to assemble all four bearing cups 6 simultaneously in accordance with the method of the invention.

In the embodiments, only those methods and apparatus are described in which the bearing cups 6 are fixed by shaping off material from the walls of the bore 3 of the yoke 5. However, other ways of fixing the bearing cups 6, e.g. by known plate armatures, can be employed. Under certain circumstances, the pressing in and the fixing of the bearing cups 6 are provided in separate working steps which is different in comparison with the embodiments. This may, however, be possible also in case of fixing the bearing cups 6 by shaping off material from the walls of the bores 3 whereby then separate rams are required for pressing in the bearing cups 6 and for shaping off the material.

The designs of the apparatus as shown in the embodiments, especially the means for providing the pressing force and for termination of the pressing process as well as the measuring elements, are to be understood only by way of an example. It is certainly within the scope of the invention, to design these elements differently.

To keep as low as possible the forces required for fixing the bearing cups 6 by shaping off material from the walls of the bores 3 of the yoke 5, it may be suitable once the pressing and fixing of the bearing cups 6 in the described manner has been carried out, to turn the pistons 17 and thus the ram sections 18 by such an angle that during repeated inserting of the ram sections 18 into the bores 3, material is shaped off the walls along additional areas and brought into contact at the bottoms 9 of the bearing cusp 6. This can be achieved in an especially simple manner with the described apparatus so that the stops 25 are retained after the inserting and fixing of the bearing cups 6 in their respective position, the pistons are retracted and turned by a suitable angular amount and finally again moved in pressing direction until they abut with their stops 24 against the stops 25.

Finally, with the method of the invention and with the apparatus as shown in FIGS. 1 and 2, also sturdy bearing cups can be assembled without eleastic flexion of their bottoms. Should the axial position in which the bottom of the massive bearing cup abuts the end face 34 of the journal 1 be determined during the pressing, the elastic flexion is eliminated as criteria for the abutment of the bottom on the end face 34 because of the sturdy design of the bearing cup.

Various modifications of the methods and apparatus of the invention may be made without departing from the spirit or scope thereof and it is to be understood that the invention is intended to be limited only as defined in the appended claims.

What we claim is:

1. A method of assembling a universal joint comprising two shafts provided with yokes at their ends and connected by means of a universal joint spider having journals supported in bores in the yokes by means of bearing cups which are unilaterially closed by a bottom wherein the end faces of the journals abut against the bottoms of the bearing cups, said method comprising initially centering the universal joint spider and the shafts relative to each other and stationarily clamped, then pressing the bearing cups in the bores in the yokes and axially fixed therin wherein the yoke arms, if necessary, are widened radially outwardly and are always immovably fixed radially inwardly, characterized by measuring or determining the axial position for each bearing cup (6) in the respective bore (3) of the yoke (5) in which the bottom (9) of the bearing cup (6) abuts against the end face (34) of the respective journal (1) and terminating the pressing process of the bearing cup (6) in this position or based on this position, continuing the pressing process under elastic flexion of the bottom (9) of the bearing cup (6) by a defined dimension (f) wherein the pressing force acts upon the bottom (9) solely at its outer edge.

2. The method of claim 1 wherein the axial position in which the bottom (9) of the bearing cup (6) abuts against the end face (34) of the journal (1) is determined before the pressing in of the bearing cup (6).

3. The method of claim 2 wherein prior to the pressing in of the bearing cup (6), the height from its bottom (9) and after centrally clamping the universal joint spider (2) and the shaft (13) relative to each other, the distance of the end face (34) of the respective journal (1) from the shaft axis (35) are measured and the bearing cup (6) is pressed in an axial position in which the distance of the outer edge of the outside of its bottom (9) from the shaft axis (35) corresponds to the sum of height of its bottom (9) and the distance of the respective end face (34) of the journal (1) from the shaft axis (35) optionally reduced by the defined dimension (f).

4. The method of claim 3 wherein the distance of the outer edge of the outside of the bottom (9) of the bearing cup (6) from the shaft axis (35) is additionally measured during the pressing process, compared with the calculated distance during the pressing process and the pressing process is terminated when the measured distance corresponds with the calculated distance.

5. The method of claim 4 wherein the beginning of the elastic flexion of the bottom (9) of the bearing cup (6) is additionally measured during the pressing process and the pressing process is interrupted if the flexion of the bottom (9) begins before the distance of the outer edge of the outside of the bottom (9) from the shaft axis (35) falls below a predetermined dimension(s).

6. The method of claim 1 wherein the axial position in which the bottom (9) of the bearing cup (6) abuts against the end face (34) of the journal(1) is measured during the pressing process.

7. The method of claim 6 wherein the axial position in which the bottom (9) of the bearing cup (6) abuts against the end face (34) of the journal (1) is determined so that the beginning of the elastic flexion of the bottom (9) of the bearing cup (6) is determined.

8. The method of claim 7 wherein the pressing process is continued by a defined dimension, characterized in that the magnitude of the elastic flexion of the bottom (9) is measured during the entire. pressing process which is stopped when the magnitude of the flexion corresponds to the defined dimension (f).

9. The method of claim 7 wherein during the pressing in at least from the beginning of the flexion of the bottom (9) of the bearing cup (6), the distance of the outer edge of the outside of its bottom (9) from the shaft axis (35) is additionally measured and the pressing process is terminated when the distance obtained at the beginning of the flexion has been reduced by the defined dimension (f).

10. The method of claim 9 wherein the distance of the outer edge of the outside of the bottom (9) of the bearing cup (6) from the shaft axis (35) is measured during the entire pressing process and the pressing process is interrupted if the flexion of the bottom (9) starts before the distance of the outer edge of the outside of the bottom (9) from the shaft axis (35) falls below the predetermined dimension/s).

11. The method of claim 1 wherein the pressing process is continued by a defined dimension, characterized in that the yoke (5) is elastically widened by such a dimension that the resulting force corresponds to the force resulting from the elastic flexion of the bottom of the bearing cup (6) by the defined dimension.

12. The method of claim 1 wherein the bearing cup (6) is axially fixed so that in a non-cutting manner material is plastically deformed at the wall of the bore (3) of the yoke (5) and brought into abutment at the outer edge of the outside of the bottom (9) of the bearing cup (6).

13. The method of claim 12 wherein the material is deformed by staking.

14. The method of claim 12 wherein at least at three areas spaced along the circumference of the bore (3) in circumferential direction material is regionally plastically deformed at the wall of the bore (3).

15. The method of claim 12 wherein the pressing in of the bearing cup (6) and the deformation of material is essentially obtained simultaneously in one working step.

16. An apparatus for assembling a universal joint comprising a frame, centering and clamping means for the universal joint spider and the shafts, optional means for widening and always means for fixing the yoke arms, a ram for pressing in and means for fixing the bearing cup and a control unit for the asembling process, characterized in that
 (a) measuring means (57,58) are provided for determining the beginning of the flexion of the bottom (9) of the bearing cup (6) and transmitting it to the control unit (61).
 (b) means (24,25) for termination of the pressing process are provided which can be actuated by the control unit (61), and
 (c) the control unit (61) in which optionally the defined dimension (f) can be stored actuates the means (24,25) for termination of the pressing process so that the latter is terminated upon beginning of the elastic flexion of the bottom (9) of the bearing cup (6) or after continuation of the pressing process by a defined dimension (f).

17. An apparatus of claim 16 wherein the measuring means (51,58) determine the magnitude of the flexion of the bottom (9) of the bearing cup (6) during the entire pressing process and the control unit (61) actuates the means (24,25) for termination of the pressing process so that the latter is terminated when the determined flexion of the bottom (9) corresponds to the defined measure (f).

18. An apparatus of claim 16 wherein measuring means (62,63) are provided which upon beginning of the flexion of the bottom (9) of the bearing cup (6) determine the distance of the outer edge of the outside of its bottom (9) from the shaft axis (35) and transmit it to the control unit (61) which actuates the means (24,25) for termination of the pressing process so the latter is terminated when the distance has been reduced by the defined dimension (f).

19. An apparatus of claim 18 wherein the measuring means (62,63) determine the distance of the outer edge of the bottom (9) from the shaft axis (35) during the entire pressing process and transmit it to the control unit (61) in which a predetermined dimension (s) can be stored for the distance of the outer edge of the outside of the bottom (9) of the bearing cup (6) from the shaft axis (35) and which during the entire pressing process compares the dimension of the distance of the bottom (9) from the shaft axis (35) with the predetermined dimension(s) and actuates provided means (31) for interruption of the pressing force or the means (24,25) for termination of the pressing process so that the latter is terminated when the measuring means (57,58) determine the beginning of the flexion of the bottom (9) before falling below the predetermined dimension(s).

20. An apparatus for assembling a universal joint comprising a frame, centering and clamping means for the universal joint spider and the shafts, optional means for widening and always means for fixing the yoke arms, a ram for pressing in and means for fixing the bearing cup and a control unit for the assembly process characterized in that (a) measuring means (39,37,41,42) are provided to measure the height of the bottom of the bearing cup (6), and to measure the distance of the end face (34) of the journal (1) of the universal joint spider (2) from the shaft axis (35) wherein the measuring means (39,37,41,42) transmit the determined dimensions to the control unit (30),
 (b) means (24,25) for terminating the pressing process are provided which can be actuated by the control unit (30), and
 (c) the control unit (30) in which optionally the defined measure (f) can be stored adds the dimensions determined by the measuring means (39,37,41,42), optionally reduced by the defined dimensions (f) and actuates the means (24,25) for the terminating the pressing process so that at the end of the pressing process, the distance of the outer edge of the outside of the bottom (9) of the bearing cup (6) from the shaft axis (35) corresponds to the previously calculated dimension.

21. An apparatus of claim 20 wherein measuring means (52,53) are provided to determine during the pressing process the distance of the outer edge of the outside of the bottom (9) from the shaft axis (35) and to transmit it to the control unit (30) which compares the respectively obtained distance with the calculated one and actuates the means (24,25) for termination of the pressing process so that the latter is terminated upon equal dimensions.

22. An apparatus of claim 21 wherein the measuring means to determine the distance of the outer edge of the outside of the bottom (9) of the bearing cup (6) from the shaft axis (35) are constituted by an inductive displacement pickup whose coil (52,62) is attached stationarily to the frame (10) and whose armature (53,63) is attached to the ram (18).

23. An apparatus of claim 21 wherein measuring means (42,54) are provided to determine the beginning of the elastic flexion of the bottom (9) of the bearing cup (6) and to transmit it to the control unit (30) in which a predetermined dimension(s) can be stored for the distance of the outer edge of the outside of the bottom (9) of the bearing cup (6) from the shaft axis (35) and which compares during the pressing process the dimension of the distance of the bottom (9) from the shaft axis (35) with the predetermined dimension (s) and actuates provided means (31) for the interruption of the pressing force or themeans (24,25) for termination of the pressing process so that the latter is terminated when the measuring means (42, 54) determine the beginning of the flexion of the bottom before falling below the predetermined dimension.

24. An apparatus of claim 23 wherein the measuring means to determine the flexion of the bottom (9) of the bearing cup (6) are constituted by an inductive displacement pickup whose armature (57) is longitudinally shaftably supported in the ram (18) and projects outwardly from its end face at the center and whose coil (58) is attached stationarily with the ram (18).

25. An apparatus of claim 20 wherein the ram (18) has an annular projection (51) with which it abuts against the outer edge of the bottom (9) of bearing cup (6).

26. An apparatus of claim 25 wherein the means for fixing the bearing cup (6) are longitudinal projections (29) attached at the outer surface of the ram (18) and ending at a distance to the end face of the annular projection (51) of the ram (18) while their outer edges are arranged on a diameter which exceeds the one of the bores (3) of the yoke (5).

27. An apparatus of claim 26 wherein the measuring means to determine the distance of the outer edge of the outside of the bottom (9) of the bearing cup (6) from the shaft axis (35) and/or the flexion of the bottom (9) additionally include an inductive displacement pickup whose coil (65) is attached to the ram (18) and whose armature (66) is longitudinally shiftably supported in the ram (18) and extends outwardly through the annular projection (51).

28. An apparatus of claim 20 wherein the measuring means to measure the height of the bottom (9) of the bearing cup (6) are defined by an inductive displacement pickup whose armature (39) is longitudinally shiftably supported in the frame (10) and whose coil (37) is attached stationarily to the frame (10).

29. An apparatus of claim 20 wherein the measuring means to measure the distance of the end face (34) of the journal (1) of the universal joint spider (2) from the shaft axis (35) are constituted by an inductive displacement pickup whose armature (42) is longitudinally shiftably supported in the ram (18) and whose coil (41) is attached stationarily to the frame (10).

30. An apparatus of claim 20 wherein the means for termination of the pressing process are elements provided for termination of movement the ram and can be actuated by the control unit (30, 61).

31. An apparatus of claim 23 wherein the means for termination of the pressing process are stops (24,25) for the ram (18) adjustable by the control unit (30, 61).

* * * * *